US009828698B2

(12) United States Patent
Wang et al.

(10) Patent No.: US 9,828,698 B2
(45) Date of Patent: Nov. 28, 2017

(54) PHTHALATE-FREE PP HOMOPOLYMERS FOR MELTBLOWN FIBERS

(71) Applicant: Borealis AG, Vienna (AT)

(72) Inventors: Jingbo Wang, Linz (AT); Katja Klimke, Abu Dhabi (AE); Joachim Fiebig, St. Marien (AT); Henk Van Paridon, Averbode (BE); Anita Luyten, Beringen (BE); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/039,107

(22) PCT Filed: Dec. 1, 2014

(86) PCT No.: PCT/EP2014/076054
§ 371 (c)(1),
(2) Date: May 25, 2016

(87) PCT Pub. No.: WO2015/082379
PCT Pub. Date: Jun. 11, 2015

(65) Prior Publication Data
US 2017/0029980 A1 Feb. 2, 2017

(30) Foreign Application Priority Data

Dec. 4, 2013 (EP) ..................... 13195766

(51) Int. Cl.
*D01F 6/06* (2006.01)
*C08F 110/06* (2006.01)
*C08L 23/12* (2006.01)
*D01D 5/098* (2006.01)
*D04H 1/4291* (2012.01)
*D04H 1/544* (2012.01)
*D04H 3/005* (2012.01)

(52) U.S. Cl.
CPC .............. *D01F 6/06* (2013.01); *C08F 110/06* (2013.01); *C08L 23/12* (2013.01); *D01D 5/0985* (2013.01); *D04H 1/4291* (2013.01); *D04H 1/544* (2013.01); *D04H 3/005* (2013.01); *C08L 2203/12* (2013.01); *C08L 2205/025* (2013.01)

(58) Field of Classification Search
CPC .......... D01F 6/06; C98F 110/06; C08L 23/12; C08L 2203/12; C08L 2205/025; D01D 5/0985; D04H 1/4291; D04H 1/544; D04H 3/005
See application file for complete search history.

(56) References Cited

U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |

(Continued)

FOREIGN PATENT DOCUMENTS

| CN | 101563226 A | 11/1997 |
| CN | 1248198 A | 3/2000 |

(Continued)

OTHER PUBLICATIONS

"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).
Britovsek et al., "The Search for New-Generation Olefin Polymerization Catalysts: Life beyond Metallocenes," *Angew. Chem, Int. Ed.*, vol. 38(4), pp. 428-447 (1999).

(Continued)

*Primary Examiner* — Nathan M Nutter
(74) *Attorney, Agent, or Firm* — Leydig, Voit & Mayer, Ltd.

(57) ABSTRACT

The present invention is directed to a new polypropylene composition comprising a propylene homopolymer, to a melt-blown fiber comprising the polypropylene composition, to a melt blown web comprising the melt blown fiber and/or the polypropylene composition, to an article comprising the melt blown fiber and/or the melt blown web as well as to the use of the polypropylene composition for improving the relation between pressure drop and hydrohead of a melt-blown web.

15 Claims, 1 Drawing Sheet

(56) References Cited

U.S. PATENT DOCUMENTS

| | | |
|---|---|---|
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,723,560 A | 3/1998 | Canich |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,322,883 B1 | 11/2001 | Williams |
| 6,365,682 B1 | 4/2002 | Alastalo et al. |
| 6,586,528 B1 | 7/2003 | Delaite et al. |
| 6,642,317 B1 | 11/2003 | Delaite et al. |
| 7,319,125 B2 | 1/2008 | Arjunan et al. |
| 7,342,078 B2 | 3/2008 | Schottek et al. |
| 7,354,979 B2 | 4/2008 | Brant et al. |
| 7,378,472 B2 | 5/2008 | Fell et al. |
| 7,429,634 B2 | 9/2008 | Brant et al. |
| 7,569,651 B2 | 8/2009 | Schottek et al. |
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 8,999,867 B2 * | 4/2015 | Van Paridon et al. ........ 525/240 |
| 9,181,423 B2 | 11/2015 | Kock et al. |
| 9,243,137 B2 | 1/2016 | Reichelt et al. |
| 2003/0149199 A1 | 8/2003 | Schottek et al. |
| 2004/0033349 A1 | 2/2004 | Henderson |
| 2004/0122191 A1 | 6/2004 | Arjunan et al. |
| 2004/0127654 A1 | 7/2004 | Brant et al. |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0034777 A1 | 2/2006 | Mahling et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2006/0211832 A1 | 9/2006 | Brant et al. |
| 2007/0235896 A1 | 10/2007 | McLeod et al. |
| 2008/0214767 A1 | 9/2008 | Mehta et al. |
| 2009/0017710 A1 | 1/2009 | Bugada et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2012/0220727 A1 | 8/2012 | Klimke et al. |
| 2013/0030121 A1 | 1/2013 | Alamo et al. |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203908 A1 | 8/2013 | Kock et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2014/0316362 A1 * | 10/2014 | Fiebig et al. ................ 525/240 |
| 2015/0024650 A1 * | 1/2015 | Boelaers et al. ............. 525/240 |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |

FOREIGN PATENT DOCUMENTS

| | | |
|---|---|---|
| CN | 1267310 A | 9/2000 |
| CN | 1684988 A | 10/2005 |
| CN | 1701081 A | 11/2005 |
| CN | 1823106 A | 8/2006 |
| CN | 101573231 A | 11/2009 |
| CN | 101772376 A | 7/2010 |
| CN | 101903103 A | 12/2010 |
| CN | 102869719 A | 1/2013 |
| CN | 103068574 A | 4/2013 |
| CN | 103080212 A | 5/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0799839 A2 | 10/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |

(56) References Cited

FOREIGN PATENT DOCUMENTS

| | | |
|---|---|---|
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2013-525531 A | 6/2013 |
| JP | 2013-525532 A | 6/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/16359 A1 | 4/1998 |
| WO | WO 98/38041 A1 | 9/1998 |
| WO | WO 98/40331 A1 | 9/1998 |
| WO | WO 98/46616 A1 | 10/1998 |
| WO | WO 98/47929 A1 | 10/1998 |
| WO | WO 98/49208 A1 | 11/1998 |
| WO | WO 98/56831 A1 | 12/1998 |
| WO | WO 98/58971 A1 | 12/1998 |
| WO | WO 98/58976 A1 | 12/1998 |
| WO | WO 98/58977 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A1 | 1/2003 |
| WO | WO 03/000757 A1 | 1/2003 |
| WO | WO 03/051934 A2 | 6/2003 |
| WO | WO 03/054035 A1 | 7/2003 |
| WO | WO 03/066698 A1 | 8/2003 |
| WO | WO 03/082879 A1 | 10/2003 |
| WO | WO 04/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

Cheng, "$^{13}$C NMR Analysis of Ethylene-Propylene Rubbers," *Macromolecules* 17:1950-1955 (1984).

(56) References Cited

OTHER PUBLICATIONS

Cimmino et al., "Thermal and mechanical properties of isotactic random propylene-butene-1 copolymers," *Polymer* 19:1222-1223 (1978).

Crispino et al., "Influence of Composition on the Melt Crystallization of Isotactic Random Propylene/1-Butene Copolymers," *Makromol. Chem.* 181:1747-1755 (1980).

Filip et al., "Heteronuclear decoupling under fast MAS by a rotor-synchronized Hahn-echo pulse train," *J. Magnet. Reson.* 176:239-243 (2005).

Fujiyama et al., "Effect of Molecular Parameters on the Shrinkage of Injection-Molded Polypropylene," *J. Appl. Polym. Sci.* 22:1225-1241 (1978).

Gahleitner et al., "Nucleation of Polypropylene Homo- and Copolymers," *International Polymer Processing* 26(1):2-20 (2011).

Galli et al., "Technology: driving force behind innovation and growth of polyolefins," *Prog. Polym. Sci.* 26:1287-1336 (2001).

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with δ6-TiCl3—Al($C_2H_5$)$_2$Cl," *Macromolecules* 15:1150-1152 (1982).

Klimke et al., "Optimisation and Application of Polyolefin Branch Quantification by Melt-State $^{13}$C NMR Spectroscopy," *Macromol. Chem. Phys.* 207(4):382-395 (2006).

Koch et al., "Evaluation of scratch resistance in multiphase PP blends," *Polymer Testing* 26: 927-936 (2007).

McAuley et al., "On-line Inference of Polymer Properties in an Industrial Polyethylene Reactor," *AIChE Journal*, vol. 37, No, 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).

Periodic Table (IUPAC Jun. 22, 2007).

*Plastics Additives Handbook*, 5th edition, Hans Zweifel, Editor, Hanser Publishers, Munich, pp. 871-873 (2001).

Plastics Additives Handbook 5th edition, Hans Zweifel, Editor, Hanser Publishers,.Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook, 2$^{nd}$ Edition*, Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

"Polyethylene Lumicene® mPE M5510 EP," Total Refining & Chemicals, Total Ecosolutions, Belgium, Aug. 2013 (2 pgs.).

European Patent Office, Extended European Search Report in European Patent Application No. 13195766.4 (Feb. 6, 2014).

European Patent Office, International Search Report in International Application No. PCT/EP2014/076054 (Feb. 10, 2015).

European Patent Office, Written Opinion in International Application No. PCT/EP2014/076054 (Feb. 10, 2015).

European Patent Office, Second Written Opinion in International Application No. PCT/EP2014/076054 (Dec. 2, 2015).

European Patent Office, International Preliminary Report on Patentability in International Application No. PCT/EP2014/076054 (Mar. 7, 2016).

European Patent Office, Office Action issued in European Application No. 14805294.7 (dated Aug. 7, 2017).

State Intellectual Property Office of the People's Republic of China, Second Notification of Office Action in Chinese Patent Application No. 201480064757.5 (dated Sep. 11, 2017).

\* cited by examiner

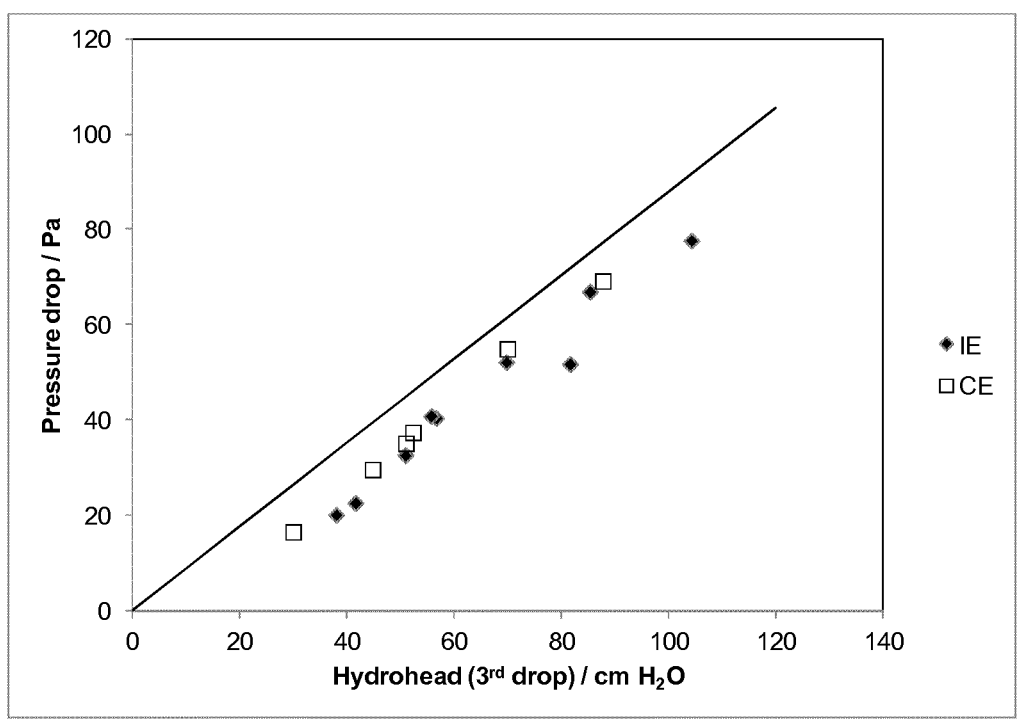

PHTHALATE-FREE PP HOMOPOLYMERS FOR MELTBLOWN FIBERS

CROSS-REFERENCE TO RELATED APPLICATIONS

This patent application is the U.S. national phase of International Application No. PCT/EP2014/076054, filed on Dec. 1, 2014, which claims the benefit of European Patent Application No. 13195766.4, filed Dec. 4, 2013, the disclosures of which are incorporated herein by reference in their entireties for all purposes.

The present invention is directed to a new polypropylene composition comprising a propylene homopolymer, to a melt-blown fiber comprising the polypropylene composition, to a melt blown web comprising the melt blown fiber and/or the polypropylene composition, to an article comprising the melt blown fiber and/or the melt blown web as well as to the use of the polypropylene composition for improving the relation between pressure drop and hydrohead of a melt-blown web.

A melt blown web, being a non-woven structure consisting of melt blown fibers, is typically made in a one-step process in which high-velocity air blows a molten thermoplastic resin from an extruder die tip onto a conveyor or take-up screen to form fine fibered self-bonding web. Although many types of polymers can be employed for melt blown fibers and fabrics, polypropylene is one of the most commonly used polymers. Normally for the manufacture of melt blown fibers and webs propylene homopolymers are used which have been prepared by using Ziegler-Natta (ZN) catalysts; especially Ziegler-Natta (ZN) catalysts comprising a specific class of internal donors, namely phthalate compounds. However, some of them are under suspicion of generating negative HSE effects and will probably be banned in the EU by the beginning of 2015. Furthermore, there is an increasing demand on the market for "phthalate-free polypropylene" suitable for fiber applications in the hygiene/personal care market. On the other side, the performance of polypropylene nonwoven webs based on melt-blown (MB) fibers or SMS fabrics (spunbonded/meltblow/spunbonded) still needs to be improved. For example, a good balance between pressure drop and hydrohead (water barrier) of these systems is desired.

Thus, the object of the present invention is to provide a polymer composition based on phthalate free ZN-catalyst which is suitable for the preparation of melt blown fibers and webs characterized by an improved or optimized relation between pressure drop and hydrohead.

The finding of the present invention is that a propylene homopolymer must be produced in the presence of a Ziegler-Natta catalyst containing an internal donor (ID) not belonging to the class of phthalic acid esters. With such a catalyst, propylene homopolymers can be produced giving an improved or optimized relation between pressure drop and hydrohead when processed into melt blown fibers.

Thus, the present invention is directed to a polypropylene composition comprising a propylene homopolymer, the polypropylene composition and/or propylene homopolymer having a) a melt flow rate $MFR_2$ (230° C./2.16 kg) measured according to ISO 1133 of ≥400 g/10 min, and b) a melting temperature Tm of ≥150° C., wherein the polypropylene composition and/or propylene homopolymer is free of phthalic acid esters as well as their respective decomposition products.

In one embodiment of the present invention, the polypropylene composition and/or propylene homopolymer has/have a) a melt flow rate $MFR_2$ (230° C./2.16 kg) measured according to ISO 1133 in the range from 400 to 3,000 g/10 min, and/or b) a melting temperature Tm in the range from 150 to 200° C.

In another embodiment of the present invention, the polypropylene composition and/or propylene homopolymer has/have been visbroken.

In yet another embodiment of the present invention, the polypropylene composition and/or propylene homopolymer has/have been visbroken with a visbreaking ratio [final $MFR_2$ (230° C./2.16 kg)/initial $MFR_2$ (230° C./2.16 kg)] of 5 to 50, wherein "final $MFR_2$ (230° C./2.16 kg)" is the $MFR_2$ (230° C./2.16 kg) of the polypropylene composition and/or propylene homopolymer after visbreaking and "initial $MFR_2$ (230° C./2.16 kg)" is the $MFR_2$ (230° C./2.16 kg) of the polypropylene composition and/or propylene homopolymer before visbreaking.

In one embodiment of the present invention, the polypropylene composition and/or propylene homopolymer is/are free of phthalic compounds as well as their respective decomposition products.

In another embodiment of the present invention, the polypropylene composition and/or propylene homopolymer has/have a) 2,1 erythro regio-defects of equal or below 0.4 mol.-% determined by $^{13}$C-NMR spectroscopy, and/or b) a pentad isotacticity (mmmm) of more than 90.0%, and/or c) a xylene cold soluble content (XCS) determined according to ISO 16152 (25° C.) of at least 1.8 wt.-%, and/or d) a crystallization temperature Tc of ≥110° C.

In yet another embodiment of the present invention, a) the propylene homopolymer is the only polymer within the polypropylene composition, and/or b) the polypropylene composition comprises at least 95.0 wt.-% of the propylene homopolymer.

In one embodiment of the present invention, the propylene homopolymer before visbreaking fulfills inequation (I)

$$VOC \leq (MFR \times 0.08) + 201.0 \qquad (I)$$

wherein

VOC is the amount of volatile organic compounds (VOC) [in ppm] measured according to VDA 278:2002 of the propylene homopolymer, preferably of the propylene homopolymer in form of pellets, before visbreaking; and MFR is the melt flow rate $MFR_2$ (230° C./2.16 kg) measured according to ISO 1133 of the propylene homopolymer before visbreaking.

In another embodiment of the present invention, the propylene homopolymer has been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester; b) optionally a co-catalyst (Co), and c) optionally an external donor (ED). It is preferred that a) the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate; b) the molar ratio of co-catalyst (Co) to external donor (ED) [Co/ED] is 5 to 45.

In yet another embodiment of the present invention, the propylene homopolymer is produced in a sequential polymerization process comprising at least two reactors (R1) and (R2), in the first reactor (R1) a first propylene homopolymer fraction (H-PP1) is produced and subsequently transferred into the second reactor (R2), in the second reactor (R2) a second propylene homopolymer fraction (H-PP2) is produced in the presence of the first propylene homopolymer fraction (H-PP1).

The present invention is also directed to a melt-blown fiber having an average diameter of not more than 5.0 μm, said fiber comprising, preferably comprising at least of 95.0 wt.-% of, a polypropylene composition as defined herein.

The present invention is further directed to a melt blown web comprising the melt blown fiber and/or the polypropylene composition as defined herein.

The present invention is also directed to an article comprising the melt blown fiber and/or a melt blown web, wherein said article is selected from the group consisting of filtration medium, diaper, sanitary napkin, panty liner, incontinence product for adults, protective clothing, surgical drape, surgical gown, and surgical wear.

The present invention is further directed to the use of a polypropylene composition as defined herein for improving the relation between pressure drop and hydrohead of a melt-blown web at an air permeability in the range from 500 to 2,000 mm/s, wherein the improvement is defined by inequation (III)

$$(PD\text{-web})/(HH\text{-web}) \leq 0.88 \qquad (III)$$

wherein
(PD-web) is the pressure drop (Pa), measured according to DIN ISO 9237, of a melt-blown web having a weight per unit area of $9.5 \pm 1.0$ g/m$^2$,
(HH-web) is the hydrohead (3$^{rd}$ drop, cm$^{-2}$ H$_2$O), measured according to standard test WSP 80.6 (09), of a melt-blown web having a weight per unit area of $9.5 \pm 1.0$ g/m$^2$.

BRIEF DESCRIPTION OF THE DRAWING

FIG. 1 depicts the melt-blown web performance with regard to the relation between pressure drop and hydrohead at a weight per unit area of $9.5 \pm 1.0$ g/m$^2$ by adapting process conditions with respect to inventive example IE and comparative example CE.

DETAILED DESCRIPTION OF THE INVENTION

In the following the invention is described in more detail.

According to the present invention, the instant polypropylene composition comprises a propylene homopolymer. Furthermore, it has been discovered that the polypropylene composition and/or the propylene homopolymer should have a melt flow rate MFR$_2$ (230° C./2.16 kg) measured according to ISO 1133 of ≥400 g/10 min, and a melting temperature Tm of ≥150° C. A further requirement is that the polypropylene composition and/or propylene homopolymer is/are free of phthalic acid esters. Thus, it is appreciated that the polypropylene composition comprises a propylene homopolymer, the polypropylene composition and/or propylene homopolymer having
a) a melt flow rate MFR$_2$ (230° C./2.16 kg) measured according to ISO 1133 of ≥400 g/10 min, and
b) a melting temperature Tm of ≥150° C.,
wherein the polypropylene composition and/or propylene homopolymer is/are free of phthalic acid esters as well as their respective decomposition products.

It is thus one requirement of the present invention that the polypropylene composition comprises a propylene homopolymer.

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

One requirement of the propylene homopolymer is its rather high melt flow rate, which differ(s) from other polymers used for instance in the melt blown technique to produce fibers. Accordingly, it is required that in the present invention the propylene homopolymer has a melt flow rate MFR$_2$ (230° C./2.16 kg) measured according to ISO 1133 of ≥400 g/10 min. In one embodiment of the present invention, the propylene homopolymer has a melt flow rate MFR$_2$ (230° C./2.16 kg) measured according to ISO 1133 in the range from 400 to 3,000 g/10 min, more preferably in the range from 450 to 2,500 g/10 min and most preferably in the range from 500 to 2,000 g/10 min.

Unless otherwise indicated, throughout the instant invention the melt flow rate (230° C./2.16 kg) of the polypropylene composition and the propylene homopolymer, respectively, is preferably the melt flow rate (230° C./2.16 kg) after visbreaking.

Thus, it is preferred that the propylene homopolymer has been visbroken.

Accordingly, the melt flow rate (230° C./2.16 kg) of the propylene homopolymer in the polypropylene composition before visbreaking is much lower, like from 20 to 400 g/10 min. For example, the melt flow rate (230° C./2.16 kg) of the propylene homopolymer before visbreaking is from 30 to 200 g/10 min, like from 40 to 150 g/10 min.

In one embodiment of the present invention, the propylene homopolymer has been visbroken with a visbreaking ratio [final MFR$_2$ (230° C./2.16 kg)/initial MFR$_2$ (230° C./2.16 kg)] of 5 to 50, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking. Preferably, the propylene homopolymer has been visbroken with a visbreaking ratio [final MFR$_2$ (230° C./2.16 kg)/initial MFR$_2$ (230° C./2.16 kg)] of 5 to 25, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking. More preferably, the propylene homopolymer has been visbroken with a visbreaking ratio [final MFR$_2$ (230° C./2.16 kg)/initial MFR$_2$ (230° C./2.16 kg)] of 5 to 15, wherein "final MFR$_2$ (230° C./2.16 kg)" is the MFR$_2$ (230° C./2.16 kg) of the propylene homopolymer after visbreaking and "initial MFR$_2$ (230° C./2.16 kg)" is the MFR$_2$ (230° C./2.16 kg) of the propylene homopolymer before visbreaking.

The propylene homopolymer before visbreaking is especially featured by a low emission. Contrary to the propylene homopolymers known in the art the emission is rather low at a specific molecular weight compared to known products. Thus, the propylene homopolymer before visbreaking fulfills inequation (I), more preferably inequation (Ia), still more preferably inequation (Ib), yet more preferably inequation (Ic), $$VOC \leq (MFR \times 0.08) + 201.0 \qquad (I)$$

$$VOC \leq (MFR \times 0.08) + 170.0 \qquad (Ia)$$

$$VOC \leq (MFR \times 0.08) + 150.0 \qquad (Ib)$$

$$VOC \leq (MFR \times 0.08) + 135.0 \qquad (Ic)$$

wherein
VOC is the amount of volatile organic compounds (VOC) [in ppm] measured according to VDA 278:2002 of the propylene homopolymer, preferably of the propylene homopolymer in form of pellets, before visbreaking; and MFR is the melt flow rate $MFR_2$ (230° C./2.16 kg) measured according to ISO 1133 of the propylene homopolymer before visbreaking.

Preferably the amount of volatile organic compounds (VOC) measured according to VDA 278:2002 of propylene homopolymer, preferably of the propylene homopolymer in form of pellets, before visbreaking is equal or below 215 ppm, more preferably equal or below 180 ppm, like equal or below 160 ppm.

The VOC values are measured on pellets as defined in detail below.

As mentioned above, one characteristic of the present polypropylene composition is that the polypropylene composition and/or the propylene homopolymer has been visbroken. Preferred mixing devices suited for visbreaking are discontinuous and continuous kneaders, twin screw extruders and single screw extruders with special mixing sections and co-kneaders.

By visbreaking the polypropylene composition and/or the propylene homopolymer with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis (tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of polypropylene composition and/or propylene homopolymer to be subjected to visbreaking, the $MFR_2$ (230° C./2.16 kg) value of the polypropylene composition and/or the propylene homopolymer to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of polymers in the polypropylene composition, more preferably based on the total amount of propylene homopolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The inventive polypropylene composition is preferably obtained by visbreaking the propylene homopolymer, preferably visbreaking by the use of peroxide.

More precisely, the inventive polypropylene composition may be obtained by visbreaking the propylene homopolymer, preferably by the use of peroxide as mentioned above, in an extruder.

After visbreaking the polypropylene composition according to this invention is preferably in the form of pellets or granules. The instant polypropylene composition is preferably used in pellet or granule form for the preparation of the melt-blown fiber or melt-blown web or article.

The propylene homopolymer is further defined by its microstructure.

Unless otherwise indicated, throughout the instant invention, the melting/crystallization behavior, xylene cold soluble content (XCS), isotacticity and the amount of <2,1> regiodefects as defined below for the polypropylene composition and the propylene homopolymer, respectively, is preferably the melting/crystallization behavior, xylene cold soluble content (XCS), isotacticity and the amount of <2,1> regiodefects of the polypropylene composition and the propylene homopolymer, respectively, after visbreaking.

Preferably the propylene homopolymer is isotactic. Accordingly, it is preferred that the polpropylene homopolymer has a rather high pentad concentration (mmmm %) i.e. more than 90.0%, more preferably more than 93.0%, like more than 93.0 to 98.5%, still more preferably at least 93.5%, like in the range of 93.5 to 97.5%.

A further characteristic of the propylene homopolymer is the low amount of misinsertions of propylene within the polymer chain, which indicates that the propylene homopolymer is produced in the presence of a Ziegler-Natta catalyst, preferably in the presence of a Ziegler-Natta catalyst (ZN-C) as defined in more detail below. Accordingly, the propylene homopolymer is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the propylene homopolymer is featured by rather high cold xylene soluble (XCS) content, i.e. by a xylene cold soluble (XCS) of at least 1.8 wt.-%, like at least 2.0 wt.-%. Accordingly, the propylene homopolymer has preferably a xylene cold soluble content (XCS) in the range of 1.8 to 5.5 wt.-%, more preferably in the range of 2.0 to 5.0 wt.-%, still more preferably in the range of 2.2 to 5.0 wt.-%.

The amount of xylene cold solubles (XCS) additionally indicates that the propylene homopolymer is preferably free of any elastomeric polymer component, like an ethylene propylene rubber. In other words, the propylene homopolymer shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the propylene homopolymer preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the propylene homopolymer according to this invention has no glass transition temperature below −30, preferably below −25° C., more preferably below −20° C.

On the other hand, in one preferred embodiment the propylene homopolymer according to this invention has a glass transition temperature in the range of −12 to 5° C., more preferably in the range of −10 to 4° C.

Further, the propylene homopolymer is preferably a crystalline propylene homopolymer. The term "crystalline" indicates that the propylene homopolymer has a rather high melting temperature. Accordingly throughout the invention the propylene homopolymer is regarded as crystalline unless otherwise indicated. Therefore, the propylene homopolymer has a melting temperature Tm measured by differential scanning calorimetry (DSC) of equal or more than 150° C., i.e. of equal or more than 150 to 168° C., more preferably of at least 155° C., i.e. in the range of 155 to 165° C.

Further it is preferred that the propylene homopolymer has a crystallization temperature Tc measured by differential scanning calorimetry (DSC) of equal or more than 110° C., more preferably in the range of 110 to 128° C., more preferably in the range of 114 to 120° C.

The propylene homopolymer is preferably featured by high stiffness. Accordingly the instant propylene homopolymer preferably has a rather high tensile modulus. Accordingly it is preferred that the propylene homopolymer has a tensile modulus measured at 23° C. according to ISO 527-1 (cross head speed 1 mm/min) of at least 1,200 MPa, more preferably in the range of 1,200 to 2,000 MPa, still more preferably in the range of 1,300 to 1,800 MPa.

Preferably, the propylene homopolymer is obtained by polymerizing propylene in the presence of a Ziegler-Natta catalyst as defined below. More preferably, the propylene homopolymer according to this invention is obtained by a process as defined in detail below by using the Ziegler-Natta catalyst.

The propylene homopolymer can comprise, more preferably can consist of, two fractions, namely a first propylene homopolymer fraction (H-PP1) and a second propylene homopolymer fraction (H-PP2). Preferably the weight ratio between the first propylene homopolymer fraction (H-PP1) and the second propylene homopolymer fraction (H-PP2) [(H-PP1):(H-PP2)] is 70:30 to 40:60, more preferably 65:35 to 45:55.

The first propylene homopolymer fraction (H-PP1) and the second propylene homopolymer fraction (H-PP2) may differ in the melt flow rate. However, it is preferred that the melt flow rate $MFR_2$ (230° C.) of the first propylene homopolymer fraction (H-PP1) and of the second propylene homopolymer fraction (H-PP2) are nearly identical, i.e. differ not more than 15% as calculated from the lower of the two values, preferably differ not more than 10%, like differ not more than 7%.

The polypropylene composition of the present invention may comprise further components. However, it is preferred that the inventive polypropylene composition comprises as polymer components only the propylene homopolymer as defined in the instant invention. Accordingly, the amount of propylene homopolymer may not result in 100.0 wt.-% based on the total polypropylene composition. Thus, the remaining part up to 100.0 wt.-% may be accomplished by further additives known in the art. However, this remaining part shall be not more than 5.0 wt.-%, like not more than 3.0 wt.-% within the total polypropylene composition. For instance, the inventive polypropylene composition may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the propylene homopolymer constitutes at least to 95.0 wt.-%, more preferably at least 97.0 wt.-% to the total polypropylene composition.

In case the propylene homopolymer comprises a α-nucleating agent, it is preferred that it is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and
(iii) salts of diesters of phosphoric acid, e.g. sodium 2,2'-methylenebis (4, 6-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", pages 871 to 873, 5th edition, 2001 of Hans Zweifel.

Preferably the propylene homopolymer contains up to 5.0 wt.-% of the α-nucleating agent. In a preferred embodiment, the propylene homopolymer contains not more than 2,500 ppm, more preferably of 5 to 2,000 ppm, more preferably of 10 to 1,500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, sodium 2,2'-methylenebis (4, 6-di-tert-butylphenyl) phosphate, vinylcycloalkane polymer, vinylalkane polymer, and mixtures thereof.

The propylene homopolymer according to this invention is preferably produced in the presence of
(a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

Preferably, the propylene homopolymer is produced in a sequential polymerization process as further described below comprising at least two reactors (R1) and (R2), in the first reactor (R1) the first propylene homopolymer fraction (H-PP1) is produced and subsequently transferred into the second reactor (R2), in the second reactor (R2) the second propylene homopolymer fraction (H-PP2) is produced in the presence of the first propylene homopolymer fraction (H-PP1).

The process for the preparation of the propylene homopolymer as well as the Ziegler-Natta catalyst (ZN-C) are further described in detail below.

In view of the above, it is appreciated that the propylene homopolymer is free of phthalic acid esters as well as their respective decomposition products, i.e. phthalic acid esters, typically used as internal donor of Ziegler-Natta (ZN) catalysts. Preferably, the propylene homopolymer is free of phthalic compounds as well as their respective decomposition products, i.e. phthalic compounds typically used as internal donor of Ziegler-Natta (ZN) catalysts.

The term "free of" phthalic acid esters, preferably phthalic compounds, in the meaning of the present invention refers to a propylene homopolymer in which no phthalic acid esters as well no respective decomposition products, preferably no phthalic compounds as well as no respective decomposition products at all, are detectable.

As the polypropylene composition is dominated by the propylene homopolymer (preferably the propylene homopolymer is the only polymer within the polypropylene composition) the polypropylene composition is preferably also free of phthalic acid esters as well as their respective decomposition products, more preferably of phthalic compounds as well as their respective decomposition products.

For the same reasons, the values concerning melt flow rate ($MFR_2$), melting/crystallization behavior, xylene cold soluble content (XCS), isotacticity and the amount of <2,1> regiodefects as defined above for the propylene homopolymer are equally applicable for the polypropylene composition.

Furthermore, the present invention is also directed to a melt-blown fiber made from the polypropylene composition as defined above. Thus, the present invention is in particular directed to a melt-blown fiber having an average filament fineness of not more than 5 μm. Furthermore, the melt-blown fiber preferably comprises at least 95.0 wt.-% based on the total weight of the melt-blown fiber, more preferably consists of, of the polypropylene composition as defined above.

The present invention is not only directed to the melt-blown fiber as such but also to articles, like webs (MBW), made thereof. Accordingly the present invention is also directed to a melt blown web comprising the melt blown fiber and/or the polypropylene composition as defined above. Further, the present invention is also directed to an article selected from the group consisting of filtration medium (filter), diaper, sanitary napkin, panty liner, incontinence product for adults, protective clothing, surgical drape, surgical gown, and surgical wear, comprising the melt-blown fiber and/or the melt-blown web (MBW), preferably in an amount of at least 80.0 wt.-% of, more preferably in an amount of at least 95.0 wt.-%, based on the total weight of the article. In one embodiment of the present invention, the article consists of the melt-blown fiber and/or the melt-blown web (MBW).

The weight per unit area of the melt-blown web depends very much on the end use, however it is preferred that the melt-blown web has a weight per unit area of at least 1 $g/m^2$, preferably in the range from 1 to 250 $g/m^2$.

In case the melt-blown web according to the instant invention is produced as a single layer web (e.g. for air filtration purposes) it has a weight per unit area of at least 5 $g/m^2$, more preferably of at least 10 $g/m^2$, yet more preferably in the range of 5 to 250 $g/m^2$, still more preferably in the range of 10 to 200 $g/m^2$.

In case the melt-blown web according to the instant invention is produced as one part of a multi-layer construction like an SMS-web comprising, preferably consisting of, a spunbonded web layer, a melt-blown web layer and another spunbonded web layer (e.g. for hygienic application), the melt-blown web has a weight per unit area of at least 0.8 $g/m^2$, more preferably of at least 1 $g/m^2$, yet more preferably in the range of 1 to 30 $g/m^2$, still more preferably in the range of 1.3 to 20 $g/m^2$. Alternatively, the multi-layer construction can also include a multiplicity of melt-blown web layers and spunbonded web layers, such as a SSMMS construction.

It is appreciated that the melt-blown web according to the instant invention has an improved or optimized relation between pressure drop and hydrohead, wherein the improvement or optimization is preferably obtained at an air permeability in the range from 500 to 2,000 mm/s. Thus, the improved or optimized relation between pressure drop and hydrohead of a melt-blown web is preferably expressed by a ratio of pressure drop (PD-web) to hydrohead (HH-web) [(PD-web)/(HH-web)] of ≤0.88, preferably ≤0.85, more preferably ≤0.82, even more preferably ≤0.8 and most preferably in the range from 0.4 to 0.88, wherein (PD-web) is the pressure drop (Pa), measured according to DIN ISO 9237, of a melt-blown web having a weight per unit area of 9.5±1.0 $g/m^2$, and the air permeability is in the range from 500 to 2,000 mm/s, (HH-web) is the hydrohead ($3^{rd}$ drop, $cm^{-2}$ $H_2O$), measured according to standard test WSP 80.6 (09), of a melt-blown web having a weight per unit area of 9.5±1.0 $g/m^2$.

Furthermore, the present invention is directed to the use of the polypropylene composition according to the present invention for the preparation of a melt-blown fiber (MBF), a melt-blown web (MBW) or an article as defined herein.

According to another aspect, the present invention is directed to the use of the polypropylene composition as defined herein for improving the relation between pressure drop and the hydrohead of a melt-blown web at an air permeability in the range from 500 to 2,000 mm/s. In particular, the improvement of the of the relation between pressure drop and hydrohead is defined by inequation (III)

$$(PD\text{-}web)/(HH\text{-}web) \leq 0.88 \qquad (III)$$

wherein (PD-web) is the pressure drop (Pa), measured according to DIN ISO 9237, of a melt-blown web having a weight per unit area of 9.5±1.0 $g/m^2$, (HH-web) is the hydrohead ($3^{rd}$ drop, $cm^{-2}$ $H_2O$), measured according to standard test WSP 80.6 (09), of a melt-blown web having a weight per unit area of 9.5±1.0 $g/m^2$.

Preferably, the improvement of the relation between pressure drop and hydrohead is defined by inequation (IIIa), more preferably inequation (IIIb), still more preferably inequation (IIIc), $$(PD\text{-web})/(HH\text{-web}) \leq 0.88 \quad \text{(IIIa)}$$

$$(PD\text{-web})/(HH\text{-web}) \leq 0.85 \quad \text{(IIIb)}$$

$$(PD\text{-web})/(HH\text{-web}) \leq 0.83 \quad \text{(IIIc)}$$

wherein
(PD-web) is the pressure drop (Pa), measured according to DIN ISO 9237, of a melt-blown web having a weight per unit area of $9.5 \pm 1.0$ g/m$^2$,
(HH-web) is the hydrohead ($3^{rd}$ drop, cm$^{-2}$ H$_2$O), measured according to standard test WSP 80.6 (09), of a melt-blown web having a weight per unit area of $9.5 \pm 1.0$ g/m$^2$.

Process for Preparing the Propylene Homopolymer

As already indicated above, the propylene homopolymer is preferably produced in a sequential polymerization process.

The term "sequential polymerization system" indicates that the propylene homopolymer is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of the first fraction ($1^{st}$ F) of the propylene homopolymer (i.e. the first propylene homopolymer fraction (H-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 70 to 80° C.; and
(b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 15 min, more preferably in the range of 15 to 80 min, still more preferably in the range of 20 to 60 min, like in the range of 24 to 50 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ('r) in the third polymerization reactor (R3)—if present—is preferably at least 30 min, more preferably in the range of 30 to 120 min, still more preferably in the range of 40 to 100 min, like in the range of 50 to 90 min.

As mentioned above the preparation of the propylene homopolymer can comprise in addition to the (main) polymerization of the propylene homopolymer in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst (ZN-C) are directly introduced into the first polymerization reactor (R1).

Accordingly, the propylene homopolymer is preferably produced in a process comprising the following steps under the conditions set out above
(a) in the first polymerization reactor (R1), i.e. in a loop reactor (LR), propylene is polymerized obtaining a first propylene homopolymer fraction (H-PP1) of the propylene homopolymer (H-PP),
(b) transferring said first propylene homopolymer fraction (H-PP1) to a second polymerization reactor (R2),
(c) in the second polymerization reactor (R2) propylene is polymerized in the presence of the first propylene homopolymer fraction (H-PP1) obtaining a second propylene homopolymer fraction (H-PP2) of the propylene homopolymer, said first propylene homopolymer fraction (H-PP1) and said second propylene homopolymer fraction (H-PP2) form the propylene homopolymer.

A pre-polymerization as described above can be accomplished prior to step (a).

The Ziegler-Natta Catalyst (ZN-C), the External Donor (ED) and the Co-Catalyst (Co)

As pointed out above in the specific process for the preparation of the propylene homopolymer as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of a)
- $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
  or
- $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
  or
- $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stilling and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor), the latter especially preferred.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

MFR$_2$ (230° C.) is measured according to ISO 1133 (230° C., 2.16 kg load)

The xylene soluble fraction at room temperature (XS, wt.-%): The amount of the polymer soluble in xylene is determined at 25° C. according to ISO 16152; 5$^{th}$ edition; 2005-07-01.

DSC analysis, melting temperature (T$_m$) and heat of fusion (H$_f$), crystallization temperature (T$_c$) and heat of crystallization (H$_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (T$_a$) and heat of crystallization (H$_c$) are determined from the cooling step, while melting temperature (T$_m$) and heat of fusion (H$_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Grammage of the Web

The unit weight (grammage) of the webs in g/m$^2$ was determined in accordance with ISO 536:1995.

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm$^2$ at 23° C. with purified water as test liquid and a rate of increase of the water pressure of 10 cm/min.

Air Permeability

The air permeability was determined in accordance with DIN ISO 9237.

Filtration Efficiency

Air filtration efficiency was determined based on EN 1822-3 for flat sheet filter media, using a test filter area of 400 cm$^2$. The particle retention was tested with an usual aerosol of di-ethyl-hexyl-sebacate (DEHS), calculating efficiency for the fraction with 0.4 μm diameter from a class analysis with 0.1 μm scale. An airflow of 16 m$^3$·h$^{-1}$ was used, corresponding to an airspeed of 0.11 m·s$^{-1}$.

Total Volatiles

VOC

VOC was determined according to VDA 278:2002 from pellets or plates of 60×60×2 mm$^3$ prepared by injection molding in accordance with ISO 294-1:1996.

VOC according to VDA 278 is the sum of all high and medium volatile compounds. It is calculated as toluene equivalent (TE). VOC according to VDA 278 represents all organic compounds in the boiling point and elution range of up to $C_{20}$ (n-eicosane).

B. Examples

The catalyst used in the polymerization process for the propylene homopolymer of the inventive example (IE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and cyclohexylmethyl dimethoxy silane (C-Donor) as donor.

The aluminium to donor ratio, the aluminium to titanium ratio and the polymerization conditions are indicated in table 1.

TABLE 1

Preparation of the inventive example IE

|  |  | IE |
|---|---|---|
| Donor type |  | C |
| TEAL/Ti | [mol/mol] | 150 |
| TEAL/Donor | [mol/mol] | 18.8 |
| Loop (H-PP1) |  |  |
| Time | [h] | 0.66 |
| Temperature | [° C.] | 75 |
| MFR$_2$ | [g/10 min] | 77.0 |
| XCS | [wt.-%] | 4.9 |
| H$_2$/C3 ratio | [mol/kmol] | 7.2 |
| amount | [wt.-%] | 100 |
| 1 GPR (H-PP2) |  |  |
| Time | [h] | — |
| Temperature | [° C.] | — |
| H$_2$/C3 ratio | [mol/kmol] | — |
| amount | [wt.-%] | 0 |
| Final |  |  |
| MFR$_2$ | [g/10 min] | 79 |
| XCS | [wt.-%] | 4.9 |
| Tm | [° C.] | 162.6 |
| Tc | [° C.] | 122.4 |
| 2,1 | [—] | n.d. |
| mmmm | [%] | 93.5 |

As comparative example CE, HL508 FB has been used. HL508FB is a commercial grade form Borealis having a MFR of 1 200 g/10 min and a melting temperature of 158° C. The catalyst used in the polymerization processes of CE was the catalyst Avant ZN L1 along with triethyl-aluminium (TEAL) as co-catalyst and cyclohexyl dimethoxy silane (C-donor) as donor.

The polymers IE and CE have been mixed with 400 ppm calcium Stearate (CAS No. 1592-23-0) and 1,000 ppm Irganox 1010 supplied by BASF AG, Germany (Pentaerythrityl-tetrakis(3-(3',5'-di-tert.butyl-4-hydroxyphenyl)-propionate, CAS No. 6683-19-8).

In a second step the propylene homopolymers IE and CE have been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target MFR$_2$ as mentioned in table 2.

TABLE 2

Properties of the Examples

| Sample | H-PP MFR$_2$ [g/10 min] | H-PP [wt.-%] | Final MFR$_2$ [g/10 min] |
|---|---|---|---|
| IE | 77 | 100 | 800 |
| CE | 80 | 100 | 800 |

The polypropylene compositions have been converted into melt-blown webs on a Reicofil MB250 line using a spinneret having 470 holes of 0.4 mm exit diameter and 35 holes per inch. Webs were produced at different melt temperatures, throughputs, DCD (die to collector distance) and air volumes. The processing conditions for and properties of the melt-blown webs are indicated in tables 3 and 4.

TABLE 3

Processing conditions for the production of the melt-blown webs

| Example | Polymer | Melt Temperature ° C. | DCD mm | Air volume m³/h | Throughput kg/h · m | Web weight g/m² |
|---|---|---|---|---|---|---|
| IE1 | IE | 250 | 500 | 470 | 10 | 8.8 |
| IE2 | IE | 250 | 200 | 470 | 10 | 9.1 |
| IE3 | IE | 250 | 200 | 550 | 30 | 9.8 |
| IE4 | IE | 270 | 500 | 380 | 10 | 8.9 |
| IE5 | IE | 270 | 200 | 310 | 10 | 9.1 |
| IE6 | IE | 270 | 200 | 490 | 30 | 9.8 |
| IE7 | IE | 290 | 500 | 280 | 10 | 8.3 |
| IE8 | IE | 290 | 200 | 230 | 10 | 8.5 |
| IE9 | IE | 290 | 200 | 380 | 30 | 9.8 |
| CE1 | CE | 260 | 200 | 550 | 10 | 10 |
| CE2 | CE | 260 | 500 | 500 | 10 | 10 |
| CE3 | CE | 270 | 200 | 450 | 30 | 9.6 |
| CE4 | CE | 280 | 500 | 420 | 30 | 9.6 |
| CE5 | CE | 290 | 500 | 400 | 30 | 9.6 |
| CE6 | CE | 290 | 200 | 350 | 30 | 9.6 |

TABLE 4

Properties of the melt-blown webs

| Example | Polymer | Air permeability mm/s | Pressure drop Pa | Efficiency % | Quality factor 100/Pa | Hydrohead (1st drop) mbar | Hydrohead (3rd drop) mbar |
|---|---|---|---|---|---|---|---|
| IE1 | IE | 1680 | 20.2 | 18.54 | 1.016 | 36.1 | 37.9 |
| IE2 | IE | 1033 | 40.5 | 21.72 | 0.606 | 42.6 | 56.5 |
| IE3 | IE | 1505 | 22.7 | 16.38 | 0.647 | 38.2 | 41.5 |
| IE4 | IE | 1144 | 32.7 | 20.21 | 0.691 | 47.3 | 50.8 |
| IE5 | IE | 811 | 51.8 | 25.18 | 0.561 | 74.4 | 81.5 |
| IE6 | IE | 950 | 40.9 | 21.77 | 0.536 | 30.8 | 55.6 |
| IE7 | IE | 799 | 52.2 | 30.47 | 0.639 | 52.7 | 69.6 |
| IE8 | IE | 624 | 77.7 | 37.8 | 0.612 | 96.7 | 104.1 |
| IE9 | IE | 675 | 67 | 26.22 | 0.455 | 61.7 | 85.2 |
| CE1 | CE | 1060 | 37.5 | 20.54 | 0.612 | 43.4 | 52.2 |
| CE2 | CE | 1850 | 16.6 | 13.04 | 0.84 | 25.5 | 29.9 |
| CE3 | CE | 986 | 55 | 26.61 | 0.739 | 58.8 | 69.8 |
| CE4 | CE | 1435 | 29.7 | 19.43 | 0.805 | 41.3 | 44.7 |
| CE5 | CE | 1649 | 35.2 | 21.65 | 0.754 | 48.3 | 50.9 |
| CE6 | CE | 718 | 69.2 | 34.09 | 0.695 | 72.5 | 87.6 |

FIG. 1 summarizes the melt-blown web performance with regard to the relation between pressure drop and hydrohead at a weight per unit area of 9.5±1.0 g/m² by adapting process conditions with respect to inventive example IE and CE.

From FIG. 1, it can be concluded that the melt-blown webs obtained from inventive Example IE show an improved or optimized relation between pressure drop and hydrohead.

The invention claimed is:

1. A polypropylene composition comprising a propylene homopolymer, the propylene homopolymer having at least 99.8 wt.-% of propylene units, the polypropylene composition and/or propylene homopolymer having
   a) a melt flow rate $MFR_2$ (230° C./2.16 kg) measured according to ISO 1133 of ≥400 g/10 min, and
   b) a melting temperature Tm of ≥150° C.,
   wherein the polypropylene composition comprises at least 95.0 wt.-% of the propylene homopolymer,
   wherein the polypropylene composition and/or propylene homopolymer is free of phthalic acid esters, and
   wherein the polypropylene composition and/or propylene homopolymer has/have been visbroken.

2. The polypropylene composition according to claim 1, wherein the polypropylene composition and/or propylene homopolymer has/have
   a) a melt flow rate $MFR_2$ (230° C./2.16 kg) measured according to ISO 1133 in the range from 400 to 3,000 g/10 min, and/or
   b) a melting temperature Tm in the range from 150 to 200° C.

3. The polypropylene composition according to claim 1, wherein the polypropylene composition and/or propylene homopolymer has/have been visbroken with a visbreaking ratio [final $MFR_2$ (230° C./2.16 kg)/initial $MFR_2$ (230° C./2.16 kg)] of 5 to 50, wherein "final $MFR_2$ (230° C./2.16 kg)" is the $MFR_2$ (230° C./2.16 kg) of the polypropylene composition and/or propylene homopolymer after visbreaking and "initial $MFR_2$ (230° C./2.16 kg)" is the $MFR_2$ (230° C./2.16 kg) of the polypropylene composition and/or propylene homopolymer before visbreaking.

4. The polypropylene composition according to claim 1, wherein the polypropylene composition and/or propylene homopolymer has/have
   a) 2,1 erythro regio-defects of equal or below 0.4 mol.-% determined by $^{13}C$-NMR spectroscopy, and/or
   b) a pentad isotacticity (mmmm) of more than 90.0%, and/or
   c) a xylene cold soluble content (XCS) determined according ISO 16152 (25° C.) of at least 1.8 wt.-%, and/or
   d) a crystallization temperature Tc of ≥110° C.

5. The polypropylene composition homopolymer according to claim 1, wherein the propylene homopolymer before visbreaking fulfills inequation (I)

$$VOC \leq (MFR \times 0.08) + 201.0 \qquad (I)$$

wherein

VOC is the volatile organic compound (VOC) value [in ppm] measured according to VDA 278:2002 of the propylene homopolymer before visbreaking; MFR is the melt flow rate $MFR_2$ (230° C./2.16 kg) measured according to ISO 1133 of the propylene homopolymer before visbreaking.

6. The polypropylene composition according to claim 1, wherein the propylene homopolymer has been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
b) optionally a co-catalyst (Co), and further
c) optionally an external donor (ED).

7. The polypropylene composition according to claim 6, wherein
a) the internal donor (ID) is selected from optionally substituted malonates, maleates, succinates, glutarates, cyclohexene-1,2-dicarboxylates, benzoates and derivatives and/or mixtures thereof; and
b) the molar-ratio of co-catalyst (Co) to external donor (ED) [Co/ED] is 5 to 45.

8. The polypropylene composition according to claim 1, wherein the propylene homopolymer is produced in a sequential polymerization process comprising at least two reactors (R1) and (R2), in the first reactor (R1) a first propylene homopolymer fraction (H-PP1) is produced and subsequently transferred into the second reactor (R2), in the second reactor (R2) a second propylene homopolymer fraction (H-PP2) is produced in the presence of the first propylene homopolymer fraction (H-PP1).

9. The polypropylene composition according to claim 2, wherein the polypropylene composition and/or propylene homopolymer has/have been visbroken with a visbreaking ratio [final $MFR_2$ (230° C./2.16 kg)/initial $MFR_2$ (230° C./2.16 kg)] of 5 to 50, wherein "final $MFR_2$ (230° C./2.16 kg)" is the $MFR_2$ (230° C./2.16 kg) of the polypropylene composition and/or propylene homopolymer after visbreaking and "initial $MFR_2$ (230° C./2.16 kg)" is the $MFR_2$ (230° C./2.16 kg) of the polypropylene composition and/or propylene homopolymer before visbreaking.

10. The polypropylene composition according to claim 2, wherein the polypropylene composition and/or propylene homopolymer has/have
a) 2,1 erythro regio-defects of equal or below 0.4 mol.-% determined by $^{13}$C-NMR spectroscopy, and/or
b) a pentad isotacticity (mmmm) of more than 90.0%, and/or
c) a xylene cold soluble content (XCS) determined according ISO 16152 (25° C.) of at least 1.8 wt.-%, and/or
d) a crystallization temperature Tc of ≥110° C.

11. The polypropylene composition according to claim 2, wherein the propylene homopolymer is the only polymer present in the polypropylene composition.

12. A melt-blown fiber having an average diameter of not more than 5.0 μm, said fiber comprising a polypropylene composition as defined in claim 1.

13. The melt-blown web comprising the melt blown fiber according to claim 12.

14. An article comprising a melt-blown fiber according to claim 12, wherein said article is selected from the group consisting of filtration medium, diaper, sanitary napkin, panty liner, incontinence product for adults, protective clothing, surgical drape, surgical gown, and surgical wear.

15. A melt-blown web having an air permeability in the range from 500 to 2,000 mm/s, and comprising the polypropylene composition of claim 1,
wherein the melt-blown web has a property defined by inequation (III)

$$(PD\text{-web})/(HH\text{-web}) \leq 0.88 \qquad (III)$$

wherein
(PD-web) is the pressure drop (Pa), measured across a thickness direction of the melt-blown web according to DIN ISO 9237, of a melt-blown web having a weight per unit area of 9.5±1.0 g/m²,
(HH-web) is the hydrohead (3$^{rd}$ drop, cm$^{-2}$ H$_2$O), measured across a thickness direction of the melt-blown web according to standard test WSP 80.6 (09), of a melt-blown web having a weight per unit area of 9.5±1.0 g/m².

* * * * *